United States Patent [19]

Epperly et al.

[11] Patent Number: 5,069,720

[45] Date of Patent: Dec. 3, 1991

[54] METHOD AND COMPOSITION FOR THE REDUCTION OF AMMONIA EMISSIONS FROM NON-ACIDIC RESIDUE

[75] Inventors: William R. Epperly, New Canaan; Barry N. Sprague, West Haven, both of Conn.

[73] Assignee: Fuel Tech, Inc., Rowayton, Conn.

[21] Appl. No.: 208,992

[22] Filed: Jun. 17, 1988

[51] Int. Cl.$^5$ .............................................. C04B 7/35
[52] U.S. Cl. ....................... 106/287.35; 106/DIG. 1; 423/DIG. 20
[58] Field of Search ................................ 106/DIG. 1; 423/DIG. 20

[56] References Cited

U.S. PATENT DOCUMENTS

| | | | |
|---|---|---|---|
| 2,230,761 | 2/1941 | Pozzi | 106/118 |
| 3,837,872 | 9/1974 | Conner | 106/74 |
| 3,984,312 | 10/1976 | Ducin et al. | 423/202 |
| 3,991,005 | 11/1976 | Wallace | 106/DIG. 1 |
| 4,088,804 | 5/1978 | Cornwell et al. | 428/220 |
| 4,147,687 | 8/1979 | O'Donnell | 106/DIG. 1 |
| 4,160,632 | 7/1979 | Scriminger et al. | 425/62 |
| 4,229,329 | 10/1980 | Bennett | 106/DIG. 1 |
| 4,328,037 | 5/1982 | Demirel et al. | 106/DIG. 1 |
| 4,352,856 | 10/1982 | Smillie | 106/DIG. 1 |
| 4,469,503 | 9/1984 | Stockel | 71/24 |
| 4,514,307 | 4/1985 | Chestnut et al. | 210/751 |
| 4,659,385 | 4/1987 | Costopoulos et al. | 106/DIG. 1 |
| 4,687,373 | 8/1987 | Falk et al. | 405/128 |

FOREIGN PATENT DOCUMENTS

| | | |
|---|---|---|
| 0031667 | 8/1981 | European Pat. Off. . |
| 0135148 | 3/1985 | European Pat. Off. . |
| 0139953 | 5/1985 | European Pat. Off. . |
| 0244981 | 11/1987 | European Pat. Off. . |
| 1146291 | 3/1985 | U.S.S.R. ................ 106/DIG. 1 |
| 1485625 | 9/1977 | United Kingdom . |
| 1500668 | 2/1978 | United Kingdom . |
| 1518024 | 7/1978 | United Kingdom . |

OTHER PUBLICATIONS

Hackh's Chemical Dictionary, 4th Edition, Grant 1986 p. 275.

*Primary Examiner*—Olik Chaudhuri
*Assistant Examiner*—Kenneth Horton
*Attorney, Agent, or Firm*—St. Onge Steward Johnston & Reens

[57] ABSTRACT

A method and composition for reducing ammonia emissions from non-acidic residue from the combustion of a carbonaceous fuel, such residue containing ammonium salts or absorbed ammonia, is presented, the method comprising applying to the residue either a physical barrier composition, a chemical barrier composition, or both, under conditions effective to reduce the emission of ammonia from the residue.

24 Claims, 2 Drawing Sheets

METHOD AND COMPOSITION FOR THE REDUCTION OF AMMONIA EMISSIONS FROM NON-ACIDIC RESIDUE

DESCRIPTION

1. Technical Field

The present invention relates to a method and composition for reducing the emissions of ammonia ($NH_3$) from non-acidic residue from the combustion of a carbonaceous fuel, such residue containing ammonium salts. The method involves application of either a physical barrier composition or a chemical barrier composition, or both, to the residue.

With the advent of technologies for the reduction of nitrogen oxides ($NO_x$), a pollutant often found in the combustion effluents of large industrial boilers and other combustion apparatus, by treatment with nitrogenous compositions such as ammonia or urea, the generation of ammonia as a byproduct of such technologies has occurred. When substantial amounts of ammonia are generated in combustion effluents a significant amount of it often gets trapped in the residue in the effluent as ammonium salts, especially ammonium sulfate, chloride and bisulfate, as well as absorbed free ammonia. When the residue is later wet (for instance by rainwater when the residue is accumulated in an unprotected environment such as a stripmine as is commonly done) the salts break down and ammonia is emitted from the residue into the atmosphere, if the residue is non-acidic (if the residue is acidic, break down of the ammonium salts is inhibited, reducing the emissions of ammonia from the residue). This is extremely undesirable, especially if there are people working in the vicinity of the residue, because ammonia is itself considered a pollutant.

What is needed, therefore, is a method for reducing the emission of ammonia from residue to prevent pollution of the environment of the residue.

2. Background Art

With the advent of nitrogen oxides reducing processes which utilize ammonia, urea or other nitrogen-containing compounds, the problem of ammonia emission from residue from the combustion of a carbonaceous fuel is a relatively new one. Consequently, there is little which has been disclosed for alleviating such undesirable emissions. One disclosure which does discuss the elimination of ammonia or ammonium salts is European Patent 135,148 which teaches a process for the removal of ammonia or ammonium salts from coal power station residues (ash) which has been treated with ammonia in a catalytic $NO_x$ reducing process. The process of this patent involves mixing the ash with calcium oxide (lime) or calcium oxidic materials and surplus amounts of water. The process involves reacting the residue with the lime for up to two hours in a reaction receptacle and a condensing device for condensing the ammonia liberated from the residue. Unfortunately, the process of European Patent 135,148 involves the use of apparatus which can be expensive and is relatively time consuming. This makes it undesirable both in terms of economics and in terms being able to adequately process all of the residue being produced in a boiler operating essentially full time.

DESCRIPTION OF INVENTION

The present invention comprises a method of reducing ammonia emissions to the environment from non-acidic residue formed from the combustion of a carbonaceous fuel, such residue containing ammonium salts or absorbed ammonia, which method comprises applying to the residue either a physical barrier composition or a chemical barrier composition, or both, under conditions effective to reduce the emission of ammonia from the residue.

BRIEF DESCRIPTION OF THE DRAWINGS

The present invention will be better understood and its advantages more apparent in view of the following detailed description, especially when read with reference to the appended drawings, wherein.

DESCRIPTION OF THE PREFERRED EMBODIMENT

Figure 1:
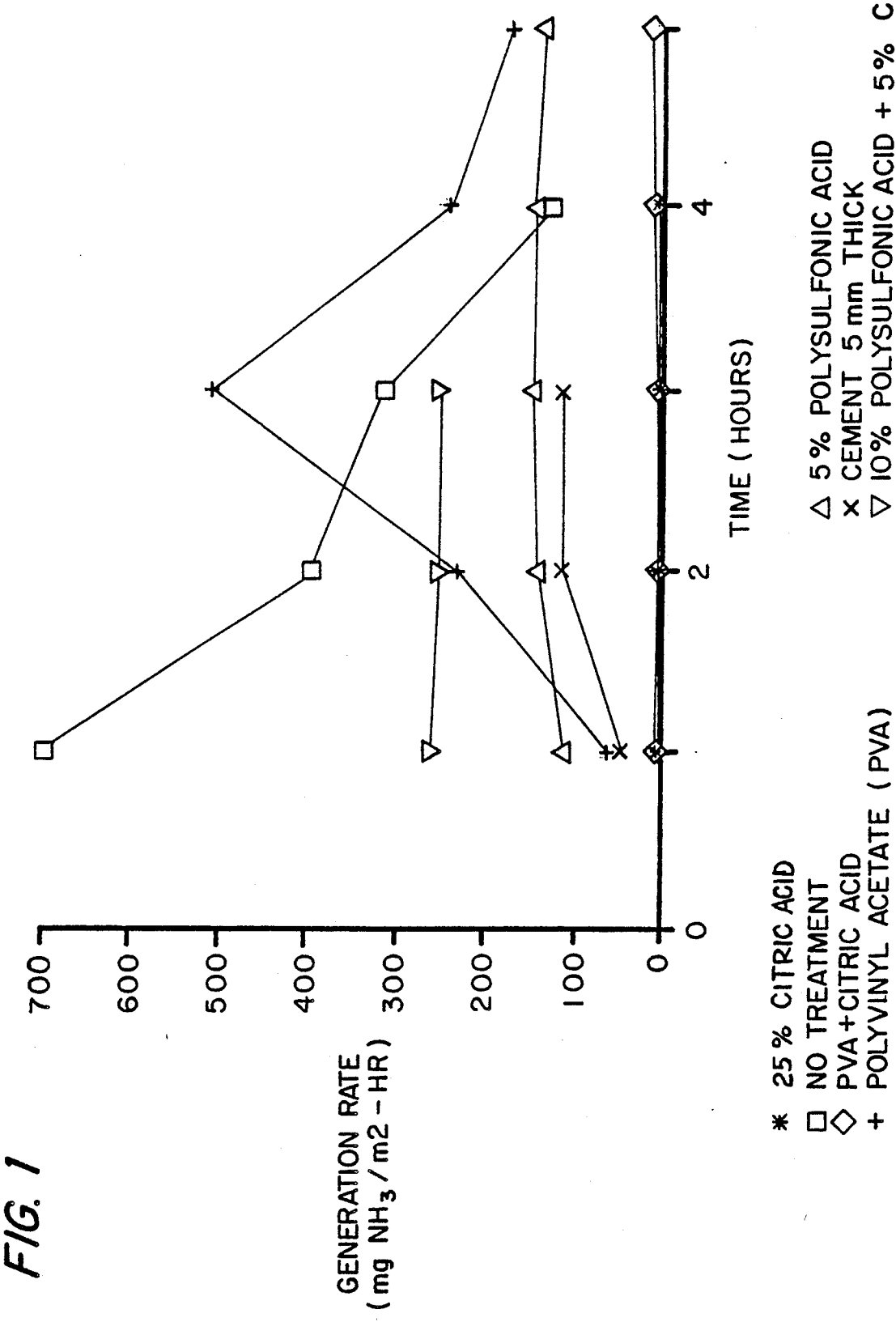
FIG. 1 is graphic representation of the results of Example I.

As noted, the present invention provides a method and a composition for reducing the emission of ammonia from non-acidic (i.e., having a pH of at least 7.0) residue (i.e., ash and other by-product solids, for instance from treatment materials added to the effluent) from the combustion of a carbonaceous fuel, wherein the residue contains ammonium salts or absorbed ammonia. Generally, the non-acidic residue being treated according to this invention is present in an accumulation. By "accumulation" is meant an amassment or "pile" of residue, typically in a location intended for permanent or semi-permanent disposal of the residue. The method involves applying to the residue (or the surface of the accumulation of residue) either a physical barrier composition or a chemical barrier composition, or both. Generally, the method involves applying to the surface of the residue a layer of the physical and/or chemical barrier compositions.

Preferably, the physical barrier composition comprises a film-forming material capable of restricting the flow of water to the residue and the flow of gaseous ammonia from the residue to the environment, when applied as a layer on the surface of the residue. The physical barrier provided by the film-forming material physically restricts or blocks the flow of water to the residue and ammonia from the residue. Suitable film-forming materials are those which form a continuous film or coating upon hydration, solidification, evaporation, removal of a solvent or carrier or polymerization.

Exemplary of film-forming materials which form a film by hydration are cement, concrete and plaster of Paris. The term "cement" as used herein refers to an adhesive consisting primarily of powdered, calcined rock and clay materials that form a paste with water and can be molded or poured to set as a solid mass. The term "concrete" as used herein refers to a material consisting of conglomerate gravel, pebbles, broken stone or slag in a mortar or cement matrix. The term "plaster of Paris" as used herein refers to any of a group of gypsum cements, primarily hemihydrated calcium sulfate, a powder which forms a paste when mixed with water and hardens into a solid.

Exemplary of film-forming materials which form a film by evaporation or removal of a solvent or carrier or by polymerization are lacquer and synthetic and natural resins. The term "lacquer" as used herein refers to a composition comprising high- or low-viscosity nitrocellulose, plasticizer and a solvent, optionally with a resin such as ester gum or rosin, which forms a coating upon evaporation of the solvent. The term "synthetic resin" as used herein refers to a man-made high polymer resulting from a chemical reaction between at least two substances, usually with heat or a catalyst; and the term "natural resin" as used herein refers to insect- or vegetable-derived, amorphous mixtures of carboxylic acids, essential oils and terpenes occuring as exudations from certain insects or on the bark of many varieties of trees and shrubs.

Exemplary of synthetic resins useful in the practice of the present invention are vinyl polymers such as polyvinyl acetate and polyvinyl alcohol; polyacrylic acid and polyacrylamide; methyl-, ethyl- and butyl methacrylate-methacrylic acid copolymers; styrene-maleic acid copolymers; methyl vinyl ether-maleic acid copolymers; carboxyester lactone polymers; polyethylene oxide polymers; phenolformaldehyde copolymers; polyester resins such as linear polyesters prepared from dicarboxylic acids and alkylene glycols like phthalic, terephthalic, isophthalic or sebacic acid and ethylene glycol; cellulose ethers such as hydroxypropylcellulose; polyurethanes; and polyamides such as those prepared from sebacic acid and hexamethylenediamine.

Exemplary of natural resins useful in the practice of the present invention are rosin (also known as colophony) and modified derivatives thereof such as rosin esterified with glycerin or pentaerythritol, dimerized and polymerized rosin, unsaturated or hydrated rosin and derivates thereof; and rosin, and derivates thereof, which has been modified with phenolic or maleic resins. Other useful natural resins include dammar, copal, sandarak, shellac and tolloel.

Other suitable film-forming materials which form a film upon evaporation or removal of a solvent or carrier are tar (when dispersed in a carrier or solvent), aqueous emulsions of coal tar pitch (which can also be rubberized and/or contain clay) and latex. Tar can also form a film by solidification when applied as a hot melt as opposed to dispersed in a carrier or solvent. The term "tar" as used herein refers to asphaltic materials, which are dark brown to black cementitious materials, solid or semi-solid in consistency, in which the predominant constituents are bitumens which occur in nature as such or are obtained as residua in petroleum refining; it is a mixture of paraffinic and aromatic hydrocarbons and heterocyclic compounds containing sulfur, nitrogen and oxygen. The term "latex" as used herein refers to either natural or synthetic latexes, natural latex being a white, tacky, aqueous suspension of a hydrocarbon polymer occurring naturally in some species of trees, shrubs or plants, and synthetic latex being produced by emulsion polymerization techniques from styrene-butadiene copolymer, acrylate resins, polyvinyl acetate, etc.

The film-forming material is most preferably dispersed in a suitable carrier (or dispersant) to more easily permit application of the film-forming material to the surface of the residue (the term "dispersion" as used herein is specifically meant to encompass dispersions, mixtures and solutions). Suitable carriers include water and hydrocarbons such as kerosene, naphtha, Varsol brand straight petroleum aliphatic solvent, methanol, ethanol and other alcohols. Of course, it will be recognized that the film-forming material being utilized should be dispersible in the carrier to facilitate application to the surface of the residue. If a water-dispersible film-forming material is being utilized, therefore, the carrier should be water. Likewise, if a hydrocarbon-dispersible film-forming material is being utilized, the carrier should be a hydrocarbon. The use of a carrier is advisable whether the film-forming material is of the type which forms a film by hydration or the type which forms a film by evaporation of a solvent or carrier or by polymerization, since in either case the carrier will be evaporated off after application.

Hydrocarbons may be undesirable as a carrier for application of the film-forming material to the residue because they are considered by some to be a health hazard if breathed or ingested. Consequently, if hydrocarbons are used as the carrier and the film-forming material/carrier composition sprayed onto the residue by conventional means, which is considered to be the most efficacious method of applying the film-forming material to the residue, although not the only method of doing so, persons or animals in the vicinity of the residue can be exposed to the hydrocarbons, especially on a windy day. The preferred carrier, therefore, is water and the preferred film-forming material is water-dispersible, such as a water-dispersible resin like polyvinyl acetate.

The film-forming material is present in the film-forming material/carrier composition of the present invention in an amount sufficient to provide a barrier to the flow of water to the residue and the flow of gaseous ammonia from the residue to the environment. This amount is dependent on the rate of application of the composition to the residue and on the particular film-forming material being utilized. There is not considered to be any upper limit on the amount of film-forming material present in the composition, i.e., there is no maximum barrier thickness for operation of the present invention, so the only upper limit is due to practical considerations such as pumpability of the composition (in other words, the ability to pump the composition through the apparatus being used to apply the composition to the residue) and cost of the composition. Preferably, the film-forming material is present in the composition in an amount of from about 1% to about 25% by weight, more preferably about 3% to about 18% by weight and most preferably about 5% to about 10% by weight. When the film-forming material is present in these amounts, the composition is preferably applied to the residue in an amount of at least about 20 grams of composition per square meter ($m^2$) of surface of residue. More preferably, the composition is applied in an amount of about 100 to about 1000 grams per $m^2$ of surface, most preferably about 200 to about 400 grams per $m^2$.

As noted, the present invention also comprises application of a chemical barrier composition, which comprises an acid, to the residue. The barrier provided by the acid is referred to as a chemical barrier since the acid is chemically reacting with the alkalinity which can liberate ammonia from the ammonium salts and/or with the absorbed ammonia in the residue to prevent emission of the ammonia.

Suitable acids for use as the chemical barrier composition include any organic or inorganic acid capable of lowering the pH of at least the uppermost layer of the residue. Such acids include mono- and poly-carboxylic acids of the general structural formula RCOOH wherein R comprises a hydrocarbon group. Common examples include citric, acetic, lactic, oxalic, benzoic and gluconic acids. Other suitable acids include common inorganic mineral acids such as sulfuric, hydrochloric, phosphoric and nitric acids, and polymeric organic acids such as polysulfonic acids. These acidic materials also include the acid salts of polyvalent acids which contain at least one available hydrogen, such as sodium or potassium bisulfate, sodium or potassium hydrogen phosphates and the sodium or potassium salts of polycarboxylic acids such as sodium or potassium binoxalate, sodium or potassium hydrogen citrates and the like.

Suitable carriers for the acid generally comprise any carrier or solvent with which the acid is compatible and include those carriers described above. Most preferred of these is water. It will be recognized that use of some of the stronger acids such as nitric acid and sulfuric acid may be undesirable since spraying such acids onto the residue may be considered harmful to people or animals in the vicinity, unless sprayed in highly dilute form.

The chemical barrier composition can be applied to the residue so as to neutralize essentially all of the residue, but, rather, for the sake of efficiency and economy, the chemical barrier composition need be applied to the surface of the residue only, since the amount of acid applied need only be that amount necessary to neutralize the uppermost layer of the residue, i.e., about the uppermost two inches or less. This is because it is only this uppermost layer which is being wet by rainwater and also because ammonia emitted from deeper in the residue must pass through this uppermost layer, and be neutralized, before it is emitted into the environment. Preferably, the acid is present in the chemical barrier composition in an amount of about 5% to about 40% by weight, more preferably about 15% to about 30% by weight, most preferably about 20% to about 25% by weight. The chemical barrier composition is preferably applied to the residue in an amount of at least about 20 grams per square meter of surface of the residue, more preferably about 100 to about 1000 grams per $m^2$, and most preferably about 200 to about 400 grams per $m^2$.

As noted above, water is the preferred carrier for the physical barrier composition of the present invention. When the physical barrier composition is applied to the surface of the residue, the carrier water can cause the emission of ammonia from the residue before drying and before the film-forming material is effective at reducing the flow of gaseous ammonia from the residue to the environment. Accordingly, when water is used as the carrier for the physical barrier composition, the chemical barrier composition can also be applied to the residue in order to neutralize the residue and prevent the ammonium salts in the residue from decomposing and emitting ammonia while the carrier is drying. In addition, any free ammonia emitted or adsorbed would react with the acid and be neutralized, preventing or reducing emissions. The chemical barrier composition can only be utilized in this manner when it is compatible with the physical barrier composition, such as a resin, to prevent damage or destruction to the physical barrier.

Advantageously, the chemical barrier composition can be incorporated in the composition comprising the film-forming material or, in another embodiment of the present invention, the chemical barrier composition can be applied to the residue as a first step and the film-forming material applied to the residue in a physical barrier composition as a second step for the reduction of ammonia emissions from the residue.

When included in the composition containing the film-forming material, the chemical barrier composition should be water dispersible since water is being used as the carrier and is preferably water-soluble to facilitate manufacture of the composition of this invention. Water remains the preferred carrier even when the acid is applied in a separate chemical barrier composition for the reasons discussed above, and therefore the acid should be water-dispersible and preferably water-soluble in this case also.

There are suitable acid compositions which can function as a film-forming material as well as the acid. Such materials are generally not as effective as the preferred compositions at forming the physical barrier to ammonia emissions but can advantageously be used depending on factors such as availability, etc. Exemplary of such materials are some polysulfonic acids, which when dried form a gel upon absorbtion of water, thereby forming a physical barrier reducing ammonia emissions, as well as the chemical barrier provided by the acid functionality.

As noted, the composition(s) of the present invention are preferably applied to the surface of the residue to reduce the emission of ammonia from the residue. This can be accomplished through application of the composition(s) to the surface of an accumulation of the residue or, alternatively, through application to the residue as it is being transported. For instance, often, when residue from the combustion of a carbonaceous fuel is being transported, the residue is sprayed with water to reduce fly-away or "dusting" of the residue. This water application can cause emission of ammonia from the residue. Inclusion of the composition(s) of the present invention in the water being used in this manner can reduce or prevent such emissions. This latter method is most advantageous only for application of the chemical barrier composition. The physical barrier composition can then be applied later, when the residue has been accumulated, either alone (especially since the chemical barrier composition has already been applied) or in conjunction with another application of the chemical barrier composition. It will be understood that there may be other methods of application or situations wherein application of the compositions of the present invention may be desired. Accordingly, these methods of application should be taken as suggestive only, and in no way as limiting the present invention.

Although there are several methods for applying the composition(s) to the residue, spraying is generally considered the most preferable. Spraying the composition(s) of the present invention can be accomplished be conventional means such as through hoses with valved nozzles for directing the flow of the composition(s). It will be recognized that in most commercial installations wherein nitrogen oxides reducing processes are being practiced, non-acidic residue from the combustion of a carbonaceous fuel, wherein the residue contains ammonium salts or absorbed ammonia, is being constantly produced during operation of the installation. Consequently, residue is constantly being added to the accumulation of residue substantially burying the previously applied composition(s). Accordingly, it is anticipated that the composition(s) of the present invention need be periodically applied to the residue for maximum effectiveness.

By the practice of this invention, the emission of ammonia from non-acidic residue containing ammonium salts or absorbed ammonia can be significantly reduced. In this way, the health hazards to humans and animals in the vicinity of the residue is correspondingly reduced. The physical and chemical barrier compositions of this invention have been found to complement each other extremely well. It has been found that the chemical barrier composition is most effective at reducing ammonia emissions from the residue from the combustion of a carbonaceous fuel over the shorter term (i.e., about four hours or less) whereas the physical barrier composition is most effective at reducing ammonia emissions over the longer term (i.e., greater than about four hours).

The following examples further illustrate and explain the present invention by detailing the reduction of ammonia emissions from non-acidic residue containing ammonium salts or absorbed ammonia by applying to the surface of the residue the composition(s) of the present invention.

EXAMPLE I

The ability of the composition of the present invention to reduce ammonia emissions from non-acidic flyash was demonstrated by the following method:

100 grams of flyash from the combustion of a carbonaceous fuel, having a pH of 10.8, to which is added 0.39 grams of $(NH_4)_2SO_4$ to provide 1000 parts per million (ppm) of ammonia in the flyash, is placed in a 1000 ml flask. The flyash in the flask is found to have an exposed surface area of 0.0325 $m^2$. In separate tests, the compositions to be tested are applied to the surface of the ash as aqueous solutions and the flask purged with nitrogen gas at a rate of 1 liter/minute into an ammonia impinger which measures the rate of emission of ammonia from the flyash. Measurements of emitted ammonia are taken every hour to provide a measurement of the ammonia emitted per hour (in milligrams per hour) and to permit calculation of the percent of the total ammonia which is in the ash (i.e., 1000 ppm) which has been emitted at the end of the hour in question (expressed as cumulative percent of total ammonia in ash which has been emitted) and the amount of ammonia which is emitted per the exposed surface area of the ash (in milligrams of ammonia per square meter of residue per hour). 50 ml of water is added to the ash at the indicated time to simulate the effect of rain on ammonia emissions from ash. The results are set out in Table 1 and are graphically illustrated in FIG. 1.

TABLE 1

| Barrier Composition | First Hour | Second Hour | Third Hour | Fourth Hour | Fifth Hour | Sixth Hour | Seventh Hour |
|---|---|---|---|---|---|---|---|
| No Barrier | 22.6* | 12.8 | 10.2 | 4.1 | | | |
| | 22.6** | 35.4 | 45.6 | 49.7 | | | |
| | 695.0*** | 394.0 | 314.0 | 126.0 | | | |
| 5% Polyvinyl Acetate, 25% Citric Acid | 0.2 | 0.1 | 0.1 | 0.27 | 0.27 | (water added after third hour) | |
| | 0.2 | 0.3 | 0.4 | 0.57 | 0.84 | | |
| | 6.2 | 3.1 | 3.1 | 8.3 | 8.3 | | |
| Cement, 5 mm thick | 1.5 | 3.7 | 3.7 | | | | |
| | 1.5 | 5.2 | 8.9 | | | | |
| | 46.1 | 114.0 | 114.0 | | | | |
| 5% Polyvinyl Acetate | 1.9 | 7.6 | 16.5 | 7.9 | 5.5 | | |
| | 1.9 | 9.5 | 26.0 | 33.9 | 39.4 | | |
| | 58.5 | 234.0 | 508.0 | 243.0 | 169.0 | | |
| 25% Citric Acid | 0.09 | 0.05 | 0.05 | 0.09 | (water added after first hour) | | |
| | 0.09 | 0.14 | 0.19 | 0.28 | | | |
| | 2.8 | 1.5 | 1.5 | 2.8 | | | |
| 5% Polysulfonic Acid | 3.7 | 4.6 | 5.5 | 4.6 | 4.3 | 5.7 | 6.4 |
| | 3.66 | 8.26 | 13.75 | 18.35 | 22.65 | 28.35 | 34.75 |
| | 113.0 | 142.0 | 147.0 | 142.0 | 132.0 | 175.0 | 197.0 |
| 10% Polysulfonic Acid, 2.5% Citric Acid | 8.4 | 8.2 | 8.2 | | | | |
| | 8.4 | 16.6 | 24.8 | | | | |
| | 258.0 | 252.0 | 252.0 | | | | |

*ammonia emitted (mg/hour)
**cumulative percent of total ammonia in ash which has been emitted
***mg ammonia emitted per $m^2$ per hour The results of Example I as noted by reference to Table 1 and FIG. 1 clearly illustrates that use of the compositions of the present invention significantly reduce the emission of ammonia from non-acidic residue containing ammonium salts or absorbed ammonia in comparison to untreated residue.

EXAMPLE II

The contribution of each element of the composition of the present invention in reducing ammonia emissions from non-acidic flyash is demonstrated by the procedure of Example I except that one of the described compositions comprises less than the preferred amount of acid. The results are set out in Table 2 and are graphically illustrated in FIG. 2.

TABLE 2

| Barrier Composition | First Hour | Second Hour | Third Hour | Fourth Hour |
|---|---|---|---|---|
| 20% Sulfuric Acid, 10% Polyvinyl Acetate[1] | 0.03* | 0.015 | 0.015 | 0.007 |
| | 0.03** | 0.045 | 0.06 | 0.067 |
| | 0.92*** | 0.46 | 0.46 | 0.22 |
| 5% Sulfuric Acid, 10% Polyvinyl Acetate[2] | 2.3 | 2.1 | 0.03 | 0.88 |
| | 2.3 | 4.4 | 4.7 | 5.58 |
| | 71.0 | 65.0 | 0.92 | 27.0 |

Figure 2:
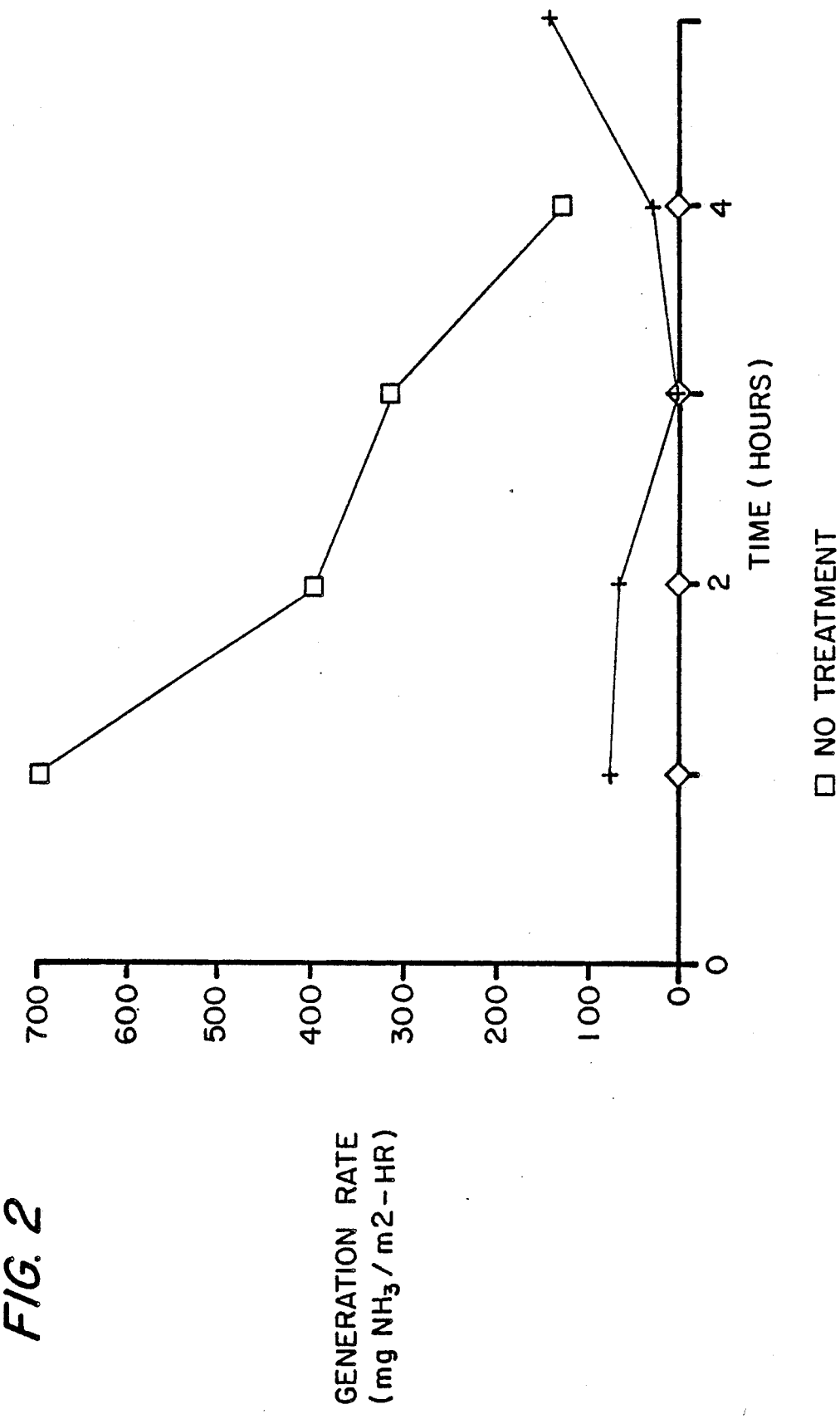
FIG. 2 is a graphic representation of the results of Example II.

*ammonia emitted (mg/hour)
**cumulative percent of total ammonia in ash which has been emitted
***mg ammonia emitted per $m^2$ per hour
[1]water added after third hour
[2]water added after second hour The results of Example II as noted by reference to Table 2 and FIG. 2 clearly illustrates that use of less than the preferred amount of acid leads to increased ammonia emission during the first two hours of treatment (but still significantly reduced compared to untreated ash as illustrated in Example I and graphed on FIG. 2) indicating that the acid does as suggested reduce ammonia emissions during the period that the aqueous carrier is drying. The fact that ammonia emissions drop off after the first two hours even after application of additional water indicates that the film-forming material does indeed act as a physical barrier for the residue.

EXAMPLE III

The effect of treatment with lime (CaO) in reducing ammonia emissions from non-acidic flyash is demonstrated by the procedure of Example I except that the flyash is treated according to the procedure described below. The results are set out in Table 3.

The following tests are run:

1. 10 grams of CaO is deposited as a layer on 100 grams of the flyash described in Example I. The sample is sprayed with 3.4 grams of water (5% over the stoichiometric amount of water for the CaO) and the ammonia emissions measured for the first two hours. 50 ml of water is then added as described in Example I and the ammonia emissions for the next two hours measured.

2. 10 grams of CaO is mixed with 100 grams of the flyash described in Example I. The sample is sprayed with 3.4 grams of water (5% over the stoichiometric amount of water for the CaO) and the ammonia emissions measured for the first two hours. 50 ml of water is then added as described in Example I and the ammonia emissions for the following two hours measured.

TABLE 3

| Test Conducted | First Two Hours | Second Two Hours |
| --- | --- | --- |
| Layer of CaO on Flyash | 7.3* | 5.5 |
|  | 14.6** | 25.6 |
|  | 112.5*** | 84.5 |
| CaO Mixed With Flyash | 12.5 | 5.5 |
|  | 25.0 | 36.0 |
|  | 192.0 | 84.5 |

*ammonia emitted (mg/hour)
**cumulative percent of total ammonia in ash which has been emitted
***mg ammonia emitted per $m^2$ per hour The results of Example III as noted by reference to Table 3 clearly illustrates that use of lime for the reduction of ammonia emissions, either as a layer or mixed with the flyash, and even when utilized according to the process of the present invention as opposed to that of the prior art, does not reduce ammonia emissions to the same extent as the compositions of the present invention.

EXAMPLE IV

The effect of treatment with other film-forming materials in reducing ammonia emissions from non-acidic flyash is demonstrated by the procedure of Example I except that the flyash has a pH of 10.6 and is treated according to the procedure described below. The results are set out in Table 4.

The following tests are run:

1. 10 grams of a 15.6% solids solution of lacquer in ethanol is deposited as a layer on 100 grams of flyash and the solvent evaporated. 50 ml of water is then added as described in Example I and the ammonia emissions for the next five hours measured. The results are set out in Table 4.

2. 10 grams of a 50% solution of roofing tar in xylene is deposited as a layer on 100 grams of flyash and the solvent evaporated. 50 ml of water is then added as described in Example I and the ammonia emissions for the next five hours measured. The results are set out in Table 4.

TABLE 4

| Barrier Composition | First Hour | Second Hour | Third Hour | Fourth Hour | Fifth Hour |
| --- | --- | --- | --- | --- | --- |
| Lacquer[1] | 0.22* | 0.43 | 0.55 | 0.92 | 1.10 |
|  | 0.22** | 0.65 | 1.20 | 2.12 | 3.22 |
| Tar[2] | 6.80*** | 13.20 | 16.90 | 28.30 | 33.8 |
|  | 0.015 | 0.015 | 0.015 | 0.015 | 0.015 |
|  | 0.015 | 0.030 | 0.045 | 0.060 | 0.075 |
|  | 0.46 | 0.46 | 0.46 | 0.46 | 0.46 |

*ammonia emitted (mg/hour)
**cumulative percent of total ammonia in ash which has been emitted
***mg ammonia emitted per $m^2$ per hour
[1]water added prior to the first hour
[2]water added prior to the first hour The results of Example IV illustrate the use of film-forming materials in association with a hydrocarbon solvent and without need for an acid in the reduction of ammonia emissions from non-acidic flyash.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

We claim:

1. A method of reducing ammonia emissions to the environment from non-acidic residue formed from the combustion of a carbonaceous fuel, such residue containing ammonium salts or absorbed ammonia, the method comprising applying to the surface of the residue a layer of a physical barrier composition, under conditions effective to reduce the emission of ammonia from the residue.

2. The method of claim 1 wherein said physical barrier composition comprises a film-forming material capable of restricting the flow of water to the residue and the flow of gaseous ammonia from the residue to the environment.

3. The method of claim 2 wherein said film-forming material comprises materials which form a film by hydration, solidification, evaporation, removal of a solvent or carrier or by polymerization.

4. The method of claim 3 wherein said film-forming material comprises a resin.

5. The method of claim 4 wherein said resin comprises polyvinyl acetate.

6. The method of claim 1 wherein said physical barrier composition comprises an aqueous dispersion.

7. The method of claim 6 wherein said physical barrier composition further comprises an acid.

8. The method of claim 7 wherein said acid is selected from the group consisting of mono- and poly-carboxylic acids of the general structural formula RCOOH wherein R comprises any hydrocarbon group, inorganic mineral acids, polymeric organic acids, and their acid salts, and mixtures thereof.

9. The method of claim 5 wherein said polyvinyl acetate is present in said composition in an amount of about 1% to about 25% by weight.

10. The method of claim 7 wherein said acid is present in said composition in an amount of about 5% to about 40% by weight.

11. A method of reducing ammonia emissions to the environment from non-acidic residue formed from the combustion of a carbonaceous fuel, such residue containing ammonium salts or absorbed ammonia, the method comprising applying to the residue a chemical barrier composition, under conditions effective to reduce the emission of ammonia from the residue.

12. The method of claim 11 wherein said chemical barrier composition comprises an acid.

13. The method of claim 12 wherein said acid is selected from the group consisting of mono- and poly-carboxylic acids of the general structural formula RCOOH wherein R comprises any hydrocarbon group, inorganic mineral acids, polymeric organic acids, and their acid salts, and mixtures thereof.

14. The method of claim 12 wherein said acid is present in said chemical barrier composition in an amount of about 5% to about 40% by weight.

15. The method of claim 11 wherein said chemical barrier composition comprises an aqueous dispersion.

16. A method of reducing ammonia emissions from non-acidic residue from the combustion of a carbonaceous fuel, such residue containing ammonium salts or absorbed ammonia, the method comprising:
   a. applying to the residue a chemical barrier composition comprising an acid; and
   b. applying to the surface of the residue a physical barrier composition comprising a film-forming material capable of restricting the flow of water to the residue and the flow of gaseous ammonia from the residue to the environment, under conditions effective to reduce the emission of ammonia from the residue.

17. The method of claim 16 wherein said film-forming material comprises materials which form a film by hydration, solidification, evaporation, removal of a solvent or carrier or by polymerization.

18. The method of claim 17 wherein said film-forming material comprises a resin.

19. The method of claim 18 wherein said resin comprises polyvinyl acetate.

20. The method of claim 16 wherein said physical barrier composition comprises an aqueous dispersion.

21. The method of claim 16 wherein said acid is selected from the group consisting of mono- and poly-carboxylic acids of the general structural formula RCOOH wherein R comprises any hydrocarbon group, inorganic mineral acids, polymeric organic acids, and their acid salts, and mixtures thereof.

22. The method of claim 20 wherein said polyvinyl acetate is present in said physical barrier composition in an amount of about 1% to about 25% by weight.

23. The method of claim 20 wherein said acid is present in said chemical barrier composition in an amount of about 5% to about 40% by weight.

24. The method of claim 20 wherein said chemical barrier composition and said physical barrier composition are present in aqueous dispersion together.

* * * * *